(12) United States Patent
Ridgway

(10) Patent No.: US 6,426,718 B1
(45) Date of Patent: Jul. 30, 2002

(54) SUBAPERTURE PROCESSING FOR CLUTTER REDUCTION IN SYNTHETIC APERTURE RADAR IMAGES OF GROUND MOVING TARGETS

(75) Inventor: Robert I. Ridgway, San Jose, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/525,642

(22) Filed: Mar. 14, 2000

(51) Int. Cl.[7] .............................................. G01S 13/534
(52) U.S. Cl. ......................... 342/160; 342/25; 342/159
(58) Field of Search ........................... 342/25, 159, 160

(56) References Cited

U.S. PATENT DOCUMENTS

| | | |
|---|---|---|
| 3,735,400 A | 5/1973 | Sletten et al. |
| 3,922,675 A * | 11/1975 | Woodhams .................. 342/160 |
| 3,975,734 A * | 8/1976 | Payne .......................... 342/25 |
| 5,559,516 A | 9/1996 | Didomizio et al. |
| 5,768,131 A | 6/1998 | Lissel et al. |
| 5,808,580 A | 9/1998 | Andrews, Jr. |
| 5,818,383 A | 10/1998 | Stockburger et al. |

OTHER PUBLICATIONS

Lightstone et al., "Multiple Phase Center DPCA for Airborne Radar", Radar Conference, Proceedings of the 1991 IEEE National On page(s): 36–40, Mar. 12–13, 1991, Los Angeles, CA, USA.*

* cited by examiner

Primary Examiner—Ian J. Lobo
(74) Attorney, Agent, or Firm—Harness Dickey & Pierce P.L.C.

(57) ABSTRACT

A radar tracking system extracts moving target content from a single radar pulse stream. The radar tracking system has a single phase center antenna for receiving the radar pulse stream. The tracking system further includes a signal processing system for converting the radar pulse stream into a plurality of SAR images. Each image has a corresponding moving target content and a corresponding clutter content. The tracking system also includes a targeting system for canceling identical clutter content between the images. The signal processing system includes a synthetic subaperture system for generating a plurality of synthetic subapertures and defining a common reference point. The common reference point has known slant ranges with respect to the plurality of synthetic subapertures. A deramping module uses a unique deramping function to compute a deramped signal for each synthetic subaperture based on the known slant ranges. The signal processing system further includes an imaging system for generating SAR images for the deramped signals. The processing of a radar pulse stream from a single antenna allows antenna size to be reduced by a factor of two or more, and allows tracking of slowly moving targets.

20 Claims, 4 Drawing Sheets

SUBAPERTURE PROCESSING FOR CLUTTER REDUCTION IN SYNTHETIC APERTURE RADAR IMAGES OF GROUND MOVING TARGETS

TECHNICAL FIELD

The present invention relates generally to clutter reduction in synthetic aperture radar images. More particularly, the invention relates to the use of synthetic subapertures to extract moving target content from a single radar pulse stream.

BACKGROUND ART

The detection of moving targets is of critical interest in military applications, and may have some commercial applications such as traffic control. Important military targets, however, can have range rates that are quite small. For example, some targets have range rates on the order of five meters per second and less. Such low range rates can make it difficult to use airborne and spaceborne radar to detect the targets moving on the ground against most clutter backgrounds. Furthermore, sometimes the moving targets reflect weaker signals than the surrounding clutter and are even more difficult to detect without an effective clutter cancellation scheme.

Synthetic Aperture Radar (SAR) imagery is effective when the area to be imaged is located far away from the trajectory of the radar platform. In such a case, the target and clutter azimuth (defined as the angle from the radar velocity vector) will not be near either zero or 180 degrees. The zero and 180 degree ranges can be addressed with doppler radar techniques, whereas subaperture processing typically fills the gap when the azimuth nears 90 degrees. In some geometries, clutter is reduced using doppler processing alone. The reduction exploits the fact that the range-rate-doppler (or range-range-rate) profiles are different for the target content and the clutter content. When the radar beam azimuth is small, the ground clutter appears as a ridge in the range-rate-doppler plane. The target content can be located in the range-rate-doppler plane at a position that is separate from the clutter content ridge. There are conditions, however, in which doppler processing fails to remove the clutter content. As the target azimuth increases from zero, the clutter content ridge increases in width, making separation via doppler processing more difficult. Near ninety degrees azimuth, if the pulse repetition rate is equal to twice the maximum doppler spread in the beam, as required for simultaneous SAR, the clutter energy will fill the entire range-rate-doppler space. In such a case, separation via ordinary doppler processing is impossible.

Near ninety degrees azimuth, synthetic aperture radar (SAR) has been used to generate multiple SAR images and cancel the clutter content between the images. Generally, multiple radar pulse streams are received and each stream is used to generate an SAR image. Such an approach is often called the multiple-phase-center-antenna (MPCA) approach. The two-center version of this approach has been called DPCA. Another term for this concept is "Arrested SAR", which implies SAR processing by itself. Existing versions of DPCA require physically separate phase centers. The essence of the MPCA concept is that two or more nearly identical representations of the ground clutter can be obtained by collecting radar pulse streams from different physical antenna phase centers. It is critical that the pulse rate and platform speed are arranged such that a successive phase center arrives at the exact same point in space that had been occupied by previous phase center. This spatial coincidence is achieved by designing the pulse rate to be equal to the platform speed divided by the phase center separation. The pulse data from each phase center can then be deramped and converted (by FFT, for example) into a plurality of SAR images. The result is that the pulse clutter content is identical from one phase center as compared with the corresponding pulse clutter content from the next phase center. By subtracting the pulse collected from one physical phase center from the pulse collected from the next phase center, the clutter is reduced. That is, one version of the clutter in one data set is subtracted from another nearly identical version in another data set. In the time it takes for the next physical phase center to arrive at the common spatial position, the target phase and amplitude may have changed enough for the target residual to be detectable.

Optimum clutter cancellation occurs when the phase of the return pulse signal from the target has changed by $\pi$ radians between phase centers, so that the target amplitudes will directly add upon pulse differencing. In this optimum case, the target actually increases by 6 dB while the clutter is reduced. On the other hand, no target residual survives if the target is not in motion relative to the clutter. In this case, it would be better to not attempt the clutter cancellation.

Under the above conventional approaches, spaceborne radar antennas are extremely expensive. Specifically, with the MPCA approach, the slower the target relative to the clutter the larger the displacement between the phase centers must be in order for the radar to detect the slowly moving target. Thus, the higher costs associated with the conventional approach are due to the need for very long physical antennas. As will be discussed below, the antenna size required to detect a target moving five meters per second or faster could exceed eighty meters using a conventional spaceborne SAR design. For space and airborne applications, an eighty meter antenna consisting of ten five-by-eight meter panels would cost approximately twenty to one hundred million dollars, depending upon whether future or current technologies are employed. The lower figure of twenty million dollars corresponds to future technology and is based on an estimate of approximately $15,000 per square foot of active antenna area. In contrast, a single five-by-eight meter panel will cost between four and twenty million dollars, again depending on the level of future technology employed. Further complexities, such as in the mechanical and electrical interface of multiple antenna panels increase costs further. Electrical compensation for the effects of channel equalization, signal delay and antenna mechanical deformation is likely to be more complex. The large antenna may require more processing power, data storage and down-link communications bandwidth.

The relationship between target range rate and required antenna length can be calculated as follows. Optimum cancellation occurs if the target range rate is equal to the radar signal wave length over the quantity:two times the pulse repetition interval. Consider a satellite in orbit with the parameters in the table below.

| | |
|---|---|
| $v_s = 7170$ | orbital speed in meters per second |
| $h = 770e3$ | altitude of satellite in meters |
| $r = 1e6$ | range to target, spot center in meters |
| $c = 3e8$ | speed of light in meters per second |
| $f = 10e9$ | frequency of signal in Hz |

-continued

| | |
|---|---|
| λ = c/f | wavelength of signal in meters |
| d = 8.3 | length of the physical antenna in meters |

The width of the spot in azimuth on the ground at a 1e6 meter slant range, transmitted from an 8.3 meter aperture, is $$s_d = \lambda r/d = 3614 \text{ meters}$$

The doppler bandwidth at that spot, and thus the required minimum pulse repetition frequency (PRF), is $$b_d = 2V_s S_d/(r\lambda) = 1728 \text{ Hz}$$

The 8.3 meter antenna can be divided into two phase centers with separation of 4.15 meters. This 4.15 meter separation corresponds to the satellite speed $V_s$ divided by the PRF. This insures coincidence of phase centers for two consecutive pulses. The optimum target range rate for this configuration is $$rdot_{opt} = 0.5\lambda prf 3600/1000 = 93.3 \text{ Km/hr}$$

For this configuration, a target would be considered to be slow moving if the range rate were approximately one-tenth of the optimum target range rate. Thus, a range rate of five kilometers per hour would be slow moving for satellite tracking purposes. The target gain against the clutter would be reduced by roughly the sign of π/10, which will reduce the target to clutter gain by 10.2 dB. More phase centers can be added to increase the length of the antenna and optimally detect the five kilometers per hour target. It would take nineteen phase centers, however, or a total antenna length of 78.3 meters to optimally detect the slow moving target.

It is therefore desirable to provide ability to detect the presence of slow moving targets in a clutter background using subaperture processing. Furthermore, obviating the need for large antennas associated with MPCA approaches is highly desirable. Reducing size will in turn reduce the cost of antennas and thereby reduce the cost of satellites.

SUMMARY OF THE INVENTION

The above and other objectives are provided by a system and method in accordance with the present invention for extracting moving target content from a radar pulse stream. The method includes the steps of receiving the radar pulse stream from a single phase center antenna, and converting the radar pulse stream into a plurality of SAR images. Each image has a corresponding moving target content and a corresponding clutter content. The method further provides for canceling identical clutter content between the images. Converting a single radar pulse stream into a plurality of SAR images allows slowly moving targets to be detected with substantially smaller and less expensive antennas.

Further in accordance with the present invention, a method for converting a radar pulse stream into a plurality of SAR images includes the step generating a plurality of synthetic subapertures based on the radar pulse stream. A common reference point is then defined, where the common reference point has known slant ranges to the plurality of synthetic subapertures. The method further provides for computing deramped signals for the synthetic subapertures based on the known slant ranges to the common reference point. SAR images can then be generated for the deramped signals.

The present invention also provides a radar tracking system having a single phase center antenna for receiving a radar pulse stream. The tracking system further includes a signal processing system for converting the radar pulse stream into a plurality of SAR images. Each image has a corresponding moving target content and a corresponding clutter content. The tracking system also includes a targeting system for canceling identical clutter content between the images.

BRIEF DESCRIPTION OF THE DRAWINGS

The various advantages of the present invention will become apparent to one skilled in the art by reading the following specification and subjoined claims and by referencing the following drawing in which:

DETAILED DESCRIPTION OF THE PREFERRED EMBODIMENTS

Figure 1:
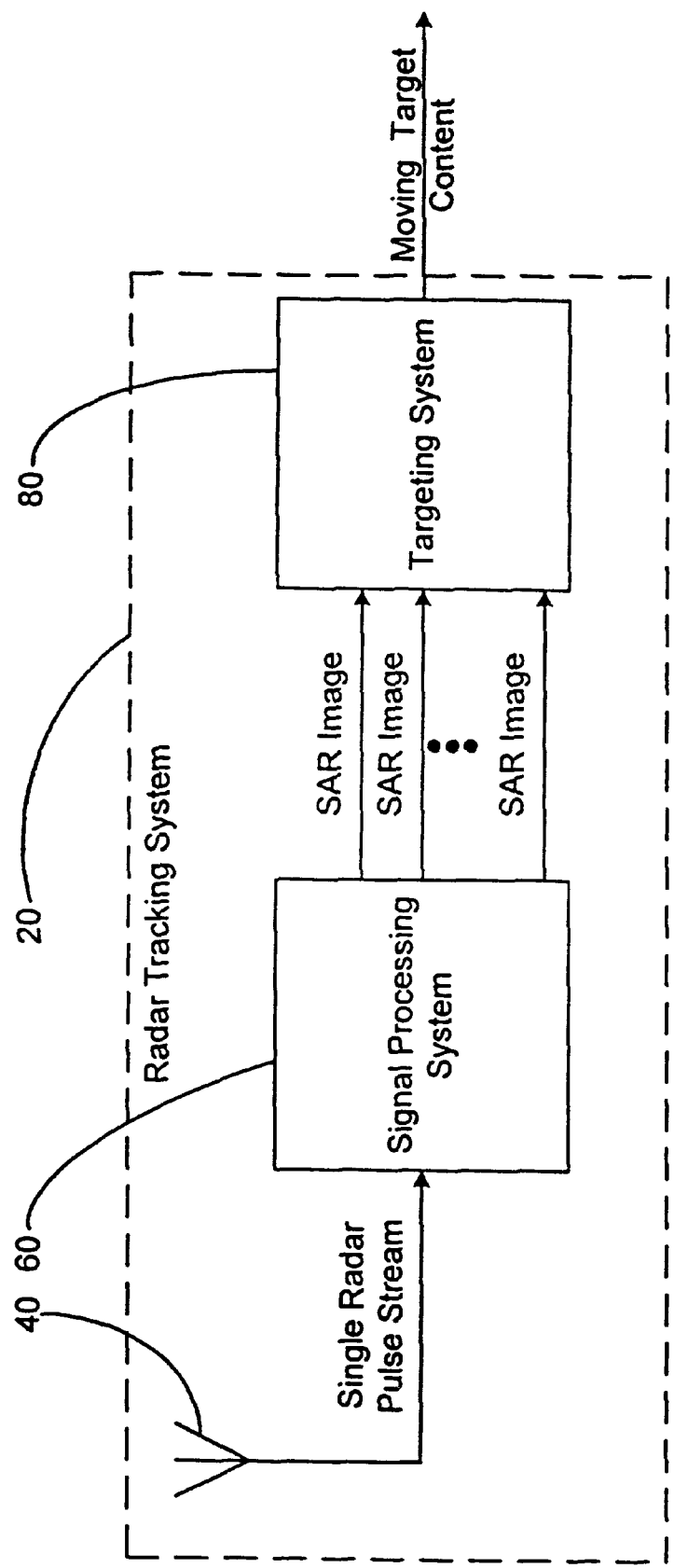
FIG. 1 is a block diagram of a radar tracking system in accordance with the present invention.

Referring to FIG. 1, the preferred radar tracking system 20 is shown. Tracking system 20 includes a single phase center antenna (SPCA) 40 for receiving a single radar pulse stream. A signal processing system 60 converts the radar pulse stream into a plurality of SAR images, where each image has a corresponding moving target content and a corresponding clutter content. The tracking system 20 further includes a targeting system 80 for canceling identical clutter content between the images. Use of the SPCA 40 as opposed to a DPCA or MPCA allows substantial reduction in the size of the overall tracking system 20.

Figure 2:
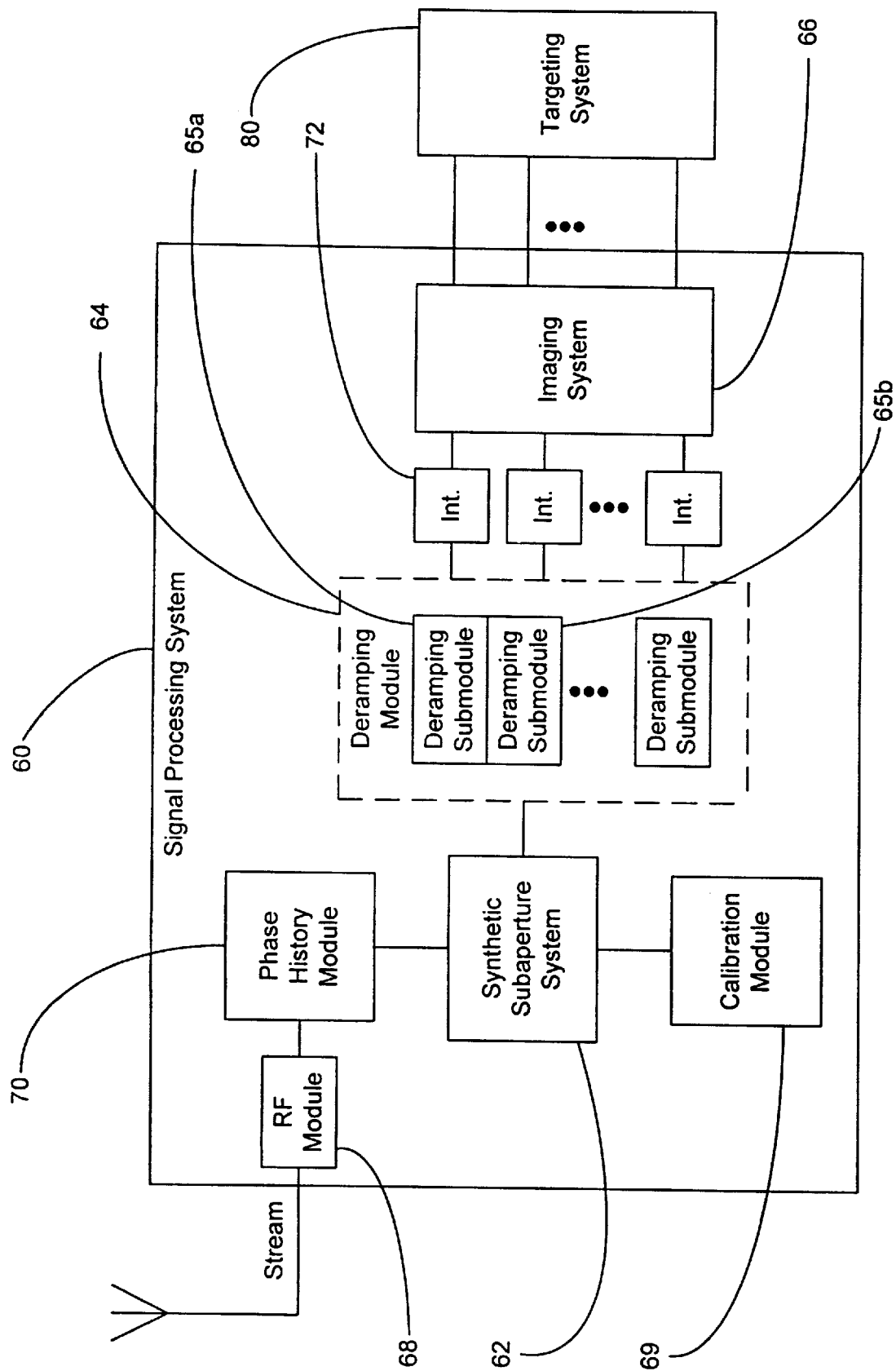
FIG. 2 is a block diagram of a signal processing system in accordance with the present invention.

Turning now to FIG. 2, it can be seen that the processing system 60 includes a synthetic subaperture system 62 for generating a plurality of synthetic subapertures based on the radar pulse stream. The synthetic subaperture system also defines a common reference point. As will be discussed in greater detail below, the common reference point has known slant ranges to the plurality of synthetic subapertures and is preferably located in the middle of the scene being imaged. The center of the scene is preferably the center of the antenna beam, with the beam pointed towards suspected concentrations of targets of interest. The signals from the targets are also collected with the signal from the reference point. A deramping module 64 computes deramped signals for the synthetic subapertures based on the known slant ranges. It can be seen that the deramping module 64 has a plurality of deramping submodules 65 depending on the number of synthetic subapertures, where each deramping submodule 65 applies a unique deramping function to a corresponding synthetic subaperture. The deramping functions are based on the known slant range between the common reference point and the corresponding synthetic subaperture. Thus, the deramping submodule 65a assigned to the first synthetic subaperture will apply a deramping function to the stream that is different from the deramping function applied by the deramping submodule 65b assigned to the second synthetic subaperture. Nevertheless, the clutter content between the resulting images will be nearly identical. The processing system 60 further includes an imaging system 66 for generating SAR images for the deramped signals.

The processing system 60 further includes an RF module 68, a phase history module 70, and a calibration module 69. The RF module 68 is responsible for the RF amplification, beam forming, anti-jamming operations (using physical subapertures for example), frequency translation, and analog to digital conversion. The phase history module 70 generates a complex phase history for the radar pulse stream. As will be discussed in greater detail below, the complex phase history includes I (real) and Q (imaginary) data. The calibration module 69 can use data from a strong reflector for calibrating the common reference point, and for calibrating the overall system response function. If the strong reflector is used, two processing passes may be required—one to extract the image of the bright point and to convert this to the impulse response function, and the second pass to use this extracted response function to correct the deramping function.

Calibration can also consist of correcting the receiver trajectory, thus correcting the deramping function. In the case of the satellite receiver, one can use the earth gravitational harmonics data from a national space center database to correct the trajectory. In the case of an airborne receiver, one can correct the aircraft trajectory by using data collected from the aircraft navigational system, these navigational data being collected concurrently with the radar signal data.

Figure 3:
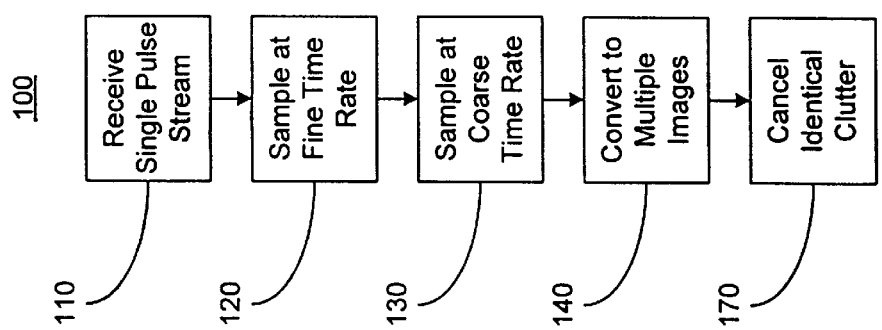
FIG. 3 is a flowchart of a method for extracting moving target content from a radar pulse stream in accordance with the present invention.

FIG. 3 demonstrates operation of the radar tracking system 20 generally at method 100. The method 100 for extracting moving target content from a radar pulse stream includes the step 110 of receiving the radar pulse stream from a single phase center antenna. The radar pulse stream is then converted into a plurality of SAR images at step 140, where each image has a corresponding moving target content and a corresponding clutter content. At step 170, the identical clutter content between the images is cancelled. The method 100 further includes the step 120 of sampling fine time pulses from the radar pulse stream at a fine time sample rate. The fine time sample rate is selected such that range details can be resolved. It can further be seen that the fine time pulses can be sampled at a coarse time sample rate at step 130. The coarse time sample rate is selected such that the fine time samples can be aligned. The sample alignment is performed such that target azimuth details can be resolved. It can be seen that once the multiple SAR images are created at step 140, the images can be subtracted from one another at step 170 such that the moving target content is extracted from the images.

Alternatively, the plurality of images can consist of several images, where all the images are combined to produce an average clutter estimate, this estimate then being subtracted from any of the individual images to produce the clutter free image. It is important to note that target azimuth can be understood as target displacement in the image (or scene) in a direction that is along the SAR track, or direction of SAR motion. Furthermore, the coarse fine time alignment can be understood as arranging the I and Q samples of the phase history data into a matrix of complex samples. For example, the row entries in the matrix correspond to fine range samples and the column entries correspond to pulse to pulse, or azimuth samples. Subsequent processing can be then understood as two-dimensional processing.

Figure 4:
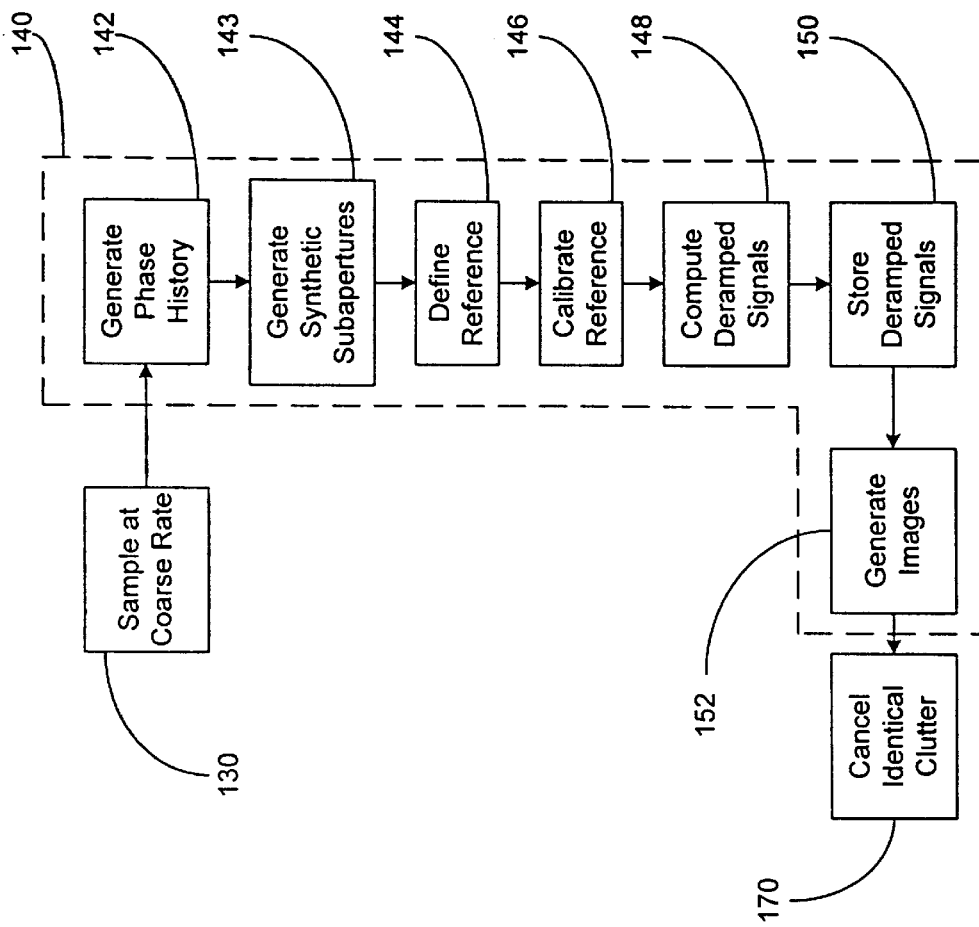
FIG. 4 is a flowchart of a method for converting a radar pulse stream into a plurality of SAR images in accordance with the present invention.

Turning now to FIG. 4, the process at step 140 of converting the radar pulse stream into a plurality of SAR images is shown in greater detail. Specifically, at step 144, a common reference point is selected where the common reference point has known slant ranges with respect to the plurality of synthetic subapertures. At step 148, deramped signals are computed for each of the synthetic subapertures based on the known slant ranges and the radar pulse stream. SAR images are generated for the deramped signals at step 152. It will be appreciated that step 152 is shown as preceding step 170 for clarity in presenting the concept, assuming that it is easy to visualize the extraction of a point target from a background of image features and noise. In fact, step 170 can be performed prior to step 152 to achieve the equivalent clutter cancellation. This reversal of operations has the practical advantage of reducing the number of computer operations required to extract the target image.

It can further be seen that in one embodiment, the conversion step 140 further includes the step 142 of generating a complex phase history for the radar pulse stream. The complex phase history has a first dimension and a second dimension, where the first dimension contains range data and the second dimension contains pulse-to-pulse or azimuth data. The conversion step 140 may further include the step 146 of calibrating the reference pulse signal with respect to a strong reflector located somewhere in the imaging scene. It can also be seen that step 150 provides for storing the deramped signals to a computer readable storage medium.

Figure 5:
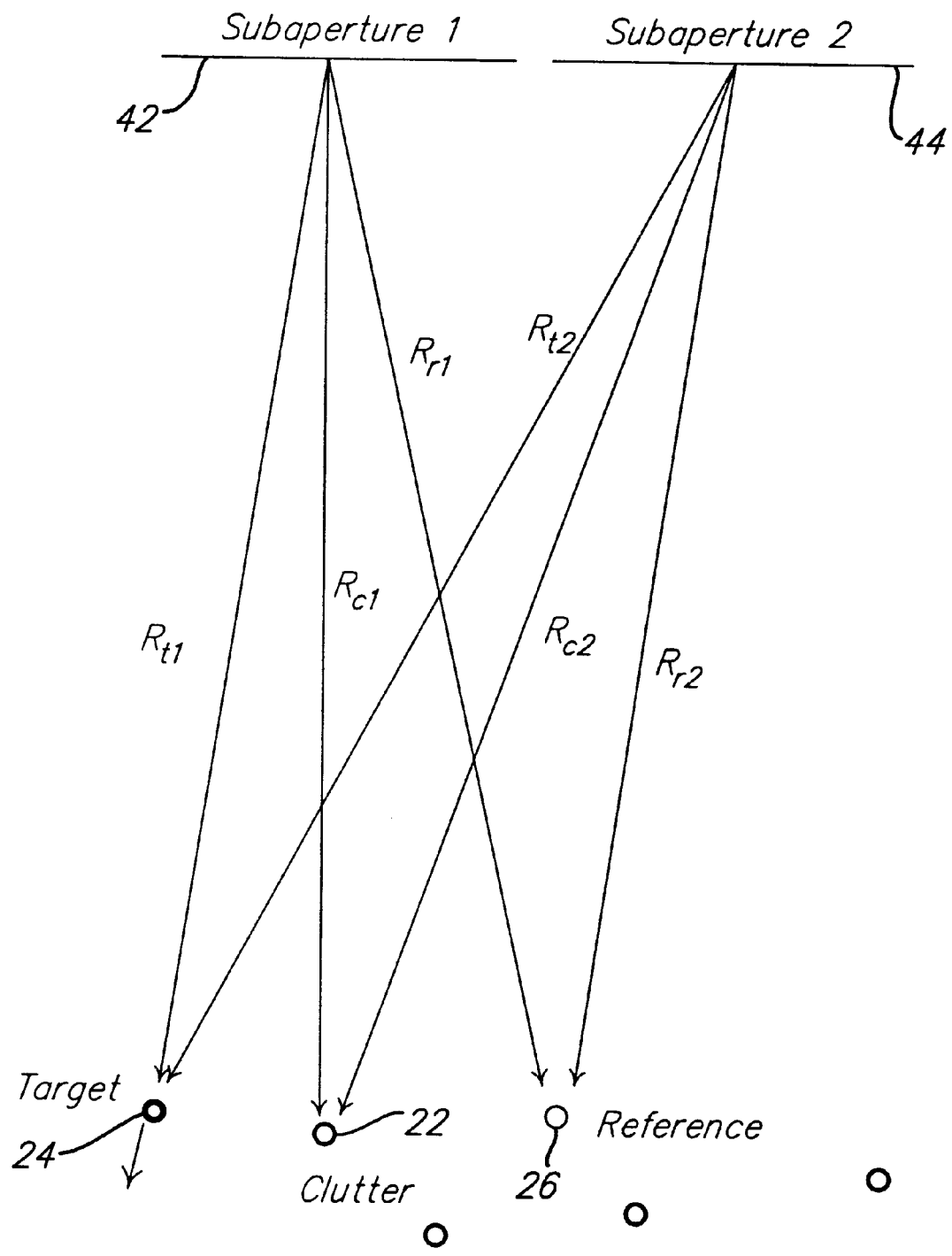
FIG. 5 is a diagram of a model of the multiple synthetic subapertures of the present invention.

Turning now to FIG. 5, operation of the multiple synthetic subapertures 42, 44 is shown in greater detail. It will be appreciated that the diagram of FIG. 5 is a highly simplified model of the overall parameters associated with the invention. The two synthetic subaperatures 42, 44 are shown as separate, but in practice they would likely overlap on a common radar path. The separation between the synthetic subapertures 42, 44 is therefore highly exaggerated. The ranges $R_c$, $R_t$ and $R_r$ to the clutter object 22, target 24 and the common reference point 26, respectfully, differ only slightly for the two synthetic subapertures 42, 44. It will further be appreciated that while two synthetic subapertures are shown in FIG. 5, more synthetic subapertures can readily be implemented without parting from the nature or scope of the invention.

The signal from any point in the scene can be given by s=A(R)S(R), where A(R) is the amplitude of a signal reflection at slant range R. S(R) is the modulation of the received signal, and represents a parabolic phase function. In the conventional linear frequency modulated (LFM) radar, $$S(R) = \exp j\left(2\pi f_c\left(t - \frac{2R}{c}\right) + \pi\gamma\left(t - \frac{2R}{c}\right)^2\right)$$

where:

| | |
|---|---|
| c = | the speed of light in meters per second; |
| $f_c$ = | the signal frequency in Hz; |
| $\gamma$ = | the linear frequency modulation rate in Hz per second; and |
| t = | an arbitrary signal sample time related to pulse transmission time. |

The signal from the target is thus $A(R_t)S(R_t)$, the signal from a clutter point is $A(R_c)S(R_c)$, and the signal from the common reference point is $A(R_r)S(R_r)$. The ranges from the synthetic subapertures 42, 44 to the common reference point 26 are known because the radar trajectory is known and the common reference point is an arbitrary invariant point at the center of the scene. The deramping signals can thus be readily computed and stored in a computer readable storage medium in the radar receiver.

If $v_1$ is the composite phase history signal for the first synthetic subaperture 42 and $v_2$ is the composite phase history signal for the second synthetic subaperture 44, the deramped signal for the first synthetic subaperture 42 is, $$z_1 = v_1 S^*(R_{r1})$$

and, the deramped signal for the second synthetic subaperture 44 is, $$z_2 = v_2 S^*(R_{r2})$$

It will be appreciated that the asterisk (*) in the above equations denote complex conjugate. The two dimensional FFTs of $z_1$ and $z_2$ generated by imaging system 66 (FIG. 2) should form almost identical clutter images. The SAR images from the synthetic subapertures 42, 44 are actually quite similar to those which would be produced by physically distinct phase centers. The images resulting from the synthetic subapertures 42, 44 differ in that they have to be processed differently than would the images from the physical phase centers, to insure that the clutter images are identical.

It will be appreciated that SAR image formation is required for pulses from the synthetic subapertures 42, 44, and not for the pulses from the physical phase centers of conventional approaches. This is because the clutter received from the successive pulses are the summations of point reflectors located throughout the beam. More particularly, the summation is over reflectors on the earth's surface that intersects the beam. During one pulse repetition interval, these reflectors change aspect to the radar and this movement tends to decorrelate the clutter from pulse-to-pulse.

In the geometry assumed above, the radar travels 8.3 meters in one pulse repetition interval. This movement causes the aspect to the target to change by 8.3/R radians or 8 microradians. A reflector at the leading edge of the 3.6 Km spot (1.8 Km from the spot center) will move relative to the radar by about 0.014 meters during the one pulse interval. Thus, roughly one half of the reflectors in the physical beam contributing to the clutter of the first pulse will be out of phase with those of the second pulse, reducing the correlation of the clutter between successive pulses to about one half. If one merely subtracted the successive pulses, one would still have about one half the clutter left. The target residual may be attenuated because of its slow motion as well. It will therefore be appreciated that the beam from the physical aperture is too large for pulse-to-pulse cancellation to work without true MPCA.

A beam that is much smaller than that from the physical aperture must be used instead. If this narrow beam is small enough, and pointed to the same location in the scene from one subaperture to the next, the clutter reflectors in this beam will not differ enough to cause decorrelation from subaperture to subaperture. The image formed from a synthetic subaperture can be thought of as the response of an antenna with a receive beam that is much narrower than the physical antenna beam. The extremely narrow synthetic subaperture beam is located somewhere within the envelope of the physical aperture beam.

Consider a synthetic subaperture formed using 128 pulses. The synthetic subaperture beam width in radians is equal to the synthetic subaperture length divided by the slant range to the target. In this example, the synthetic subaperture beam would be 0.0016 degrees. This can be compared with the 0.21 degree beamwidth for the physical antenna of 8.3 meters in length. One could expect the phase differences across the synthetic spot to be reduced from 0.014 meters to 0.014/128 or 1.1e-4 meters, for a phase dispersion at 10 GHz of 0.21 degrees. This amount of dispersion does not have a significant effect on beam-to-beam clutter correlation.

Synthetic subaperture processing extracts a moving target in a similar manner to that of true DPCA. If one subtracts the processing result for one synthetic subaperture from that of the next, the clutter will be reduced in each of the pixels because of the high correlation of the clutter between corresponding pixels for the synthetic subapertures. The pixels that contain the target contain a non-zero residual because the target phase has changed between the centers of the synthetic subapertures. The result will be a gain in the target bin for target-to-clutter ratio if the phase change is sufficient.

The present invention can be implemented in either hardware or software, and provides substantial cost savings over conventional approaches. It can further be seen in FIG. 2 that the signal processing system 60 can further include interpolation modules 72. The interpolation modules 72 will interpolate the real and imaginary parts of the phase history data if the pixels at the edge of the scene do not exactly match and overlap. This may occur if the distance between the synthetic subapertures is large. The targeting system 80 detects the presence of the target, locates the target and azimuth and range, and associates target points with one another. The target location in the difference image will be correct in range, but the detected azimuth of the target will probably be in error because of the coupling between the ground clutter doppler and the target range rate. Radial motion of the target causes target image displacement in azimuth and can even force the target past the ambiguous azimuth limit. This problem can be solved using external direction finding methods, or by registering the azimuth of the target to a known road or terrain feature. This implies retaining one or more of the SAR images for clutter analysis. Targets can be associated with one another and removed from false alarm targets by spatial filtering methods.

It will be appreciated that there will be some spreading of the residual target image because of target range motion. This can decrease the detection probability and skew the target location data. The distortion happens because the motion disturbs the constant sinewave nature of the deramped data. If there is any prior knowledge of the target range rate, this can be used to generate a matched filter for the target residual of interest, to sharpen the image of this target prior to detection. This implies a multiple hypothesis testing process that will be appropriate for high interest weak targets. One would guess at the range rate, filter the deramped difference data, and attempt a detection. The range rates would be searched until the successful detection is obtained.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for extracting moving target content from a radar pulse stream, the method comprising the steps of:

receiving the radar pulse stream from a single phase center antenna;

converting the radar pulse stream into a plurality of synthetic aperture radar images, each image having a corresponding moving target content and a corresponding clutter content; and canceling identical clutter content between the images.

2. The method of claim 1 further including the steps of:

generating a plurality of synthetic subapertures based on the radar pulse stream;

defining a common reference point, the common reference point having known slant ranges with respect to the plurality of synthetic subapertures; and computing a deramped signal for each synthetic subaperture based on the known slant range to the common reference point.

3. The method of claim 2 further including the step of generating synthetic aperture radar images for the deramped signals.

4. The method of claim 3 further including the step of performing a fast fourier transform on the deramped signals.

5. The method of claim 2 further including the step of generating a complex phase history for the radar pulse stream, wherein the complex phase history has a first dimension and a second dimension, the first dimension containing range data and the second dimension containing pulse-to-pulse data.

6. The method of claim 2 further including the step of applying a unique deramping function to each synthetic subaperture.

7. The method of claim 6 further including the step of multiplying each synthetic aperture by a complex conjugate of a complex phase modulated signal from the common reference point.

8. The method of claim 2 further including the step of storing the deramped signals to a computer readable storage medium.

9. The method of claim 1 further including the steps of:

sampling fine time pulses from the radar pulse stream at a fine time sample rate; and sampling the fine time pulses at a coarse time sample rate.

10. The method of claim 9 wherein the fine time sample rate is selected such that range details can be resolved.

11. The method of claim 9 wherein coarse time sample rate is selected such that the fine time samples can be aligned.

12. The method of claim 1 wherein the plurality of synthetic aperture radar images includes first image and a second image, the method further including the step of subtracting the second image from the first image such that the moving target content is extracted from the images.

13. A method for converting a radar pulse stream into a plurality of synthetic aperture radar images, the method comprising the steps of:

generating a plurality of synthetic subapertures based on the radar pulse stream;

defining a common reference point, the common reference point having known slant ranges with respect to the plurality of synthetic subapertures;

computing deramped signals for the synthetic subapertures based on the known slant ranges and the radar pulse stream; and generating synthetic aperture radar images for the deramped signals.

14. The method of claim 13 further including the step of applying a unique deramping function to each synthetic aperture.

15. The method of claim 14 further including the step of multiplying each synthetic aperture by a complex conjugate of a complex phase modulated signal from the common reference point.

16. The method of claim 13 further including the step of generating a complex phase history for the radar pulse stream, wherein the complex phase history has a first dimension and a second dimension, the first dimension containing range data and the second dimension containing pulse-to-pulse or azimuth data.

17. A radar tracking system comprising:

a single phase center antenna for receiving a radar pulse stream;

a signal processing system for converting the radar pulse stream into a plurality of synthetic aperture radar images, each image having a corresponding moving target content and a corresponding clutter content; and a targeting system for cancelling identical clutter content between the images.

18. The tracking system of claim 17 wherein the signal processing system includes:

a synthetic subaperture system for generating a plurality of synthetic subapertures based on the radar pulse stream, the synthetic subaperture system further defining a common reference point having known ranges with respect to the plurality of synthetic subapertures;

a deramping module for computing deramped signals for the synthetic subapertures based on the known ranges and the radar pulse stream; and an imaging system for generating synthetic aperture radar images for the deramped signals.

19. The tracking system of claim 18 wherein the deramping module includes a plurality of deramping submodules, where each deramping subaperture applies a unique deramping function to a corresponding synthetic subaperture.

20. The tracking system of claim 18 wherein the signal processing system further includes a phase history module for generating a complex phase history for the radar pulse stream.

\* \* \* \* \*